(12) United States Patent
Otto et al.

(10) Patent No.: US 7,262,263 B2
(45) Date of Patent: Aug. 28, 2007

(54) METHOD AND APPARATUS FOR PRODUCING SOLID-STATE POLYCONDENSED POLYESTERS

(76) Inventors: Brigitta Otto, Bergstrasse 6a, 14715 Milow (DE); Hans Reitz, Helgebornstrasse 42, 61191 Rosbach (DE); Gerd Alsheimer, Maingrabenstrasse 7, 63477 Maintal (DE)

( * ) Notice: Subject to any disclaimer, the term of this patent is extended or adjusted under 35 U.S.C. 154(b) by 0 days.

(21) Appl. No.: 10/497,279

(22) PCT Filed: Aug. 6, 2002

(86) PCT No.: PCT/EP02/08769

§ 371 (c)(1),
(2), (4) Date: Nov. 22, 2004

(87) PCT Pub. No.: WO03/046045

PCT Pub. Date: Jun. 5, 2003

(65) Prior Publication Data

US 2005/0080225 A1  Apr. 14, 2005

(30) Foreign Application Priority Data

Nov. 30, 2001 (DE) ............................. 101 58 793

(51) Int. Cl.
C08G 64/00 (2006.01)

(52) U.S. Cl. .................. 528/272; 264/140; 422/131; 422/143; 528/271

(58) Field of Classification Search ............... 264/140; 422/131, 143; 528/271, 272
See application file for complete search history.

(56) References Cited

U.S. PATENT DOCUMENTS

| 2,974,126 | A |  | 3/1961  | Kelley |
|---|---|---|---|---|
| 3,492,283 | A |  | 1/1970  | Miller |
| 4,064,112 | A |  | 12/1977 | Rothe et al. |
| 4,161,578 | A |  | 7/1979  | Herron |
| 4,198,161 | A |  | 4/1980  | Larson |
| 4,223,128 | A |  | 9/1980  | Halek et al. |
| 4,230,819 | A |  | 10/1980 | Hauenstein et al. |
| 4,327,759 | A |  | 5/1982  | Millis |
| 4,370,302 | A |  | 1/1983  | Suzuoka et al. |
| 4,584,366 | A |  | 4/1986  | Gerking et al. |
| 5,090,134 | A | * | 2/1992  | Russemeyer et al. ......... 34/589 |
| 5,098,667 | A |  | 3/1992  | Young et al. |
| 5,292,865 | A |  | 3/1994  | Kerpes et al. |
| 5,362,844 | A |  | 11/1994 | Kerpes et al. |
| 5,536,810 | A | * | 7/1996  | Thiele ........................ 528/481 |
| 5,558,678 | A |  | 9/1996  | Weger |
| 5,573,820 | A |  | 11/1996 | Harazoe et al. |
| 5,663,290 | A |  | 9/1997  | Heise et al. |
| 5,714,571 | A | * | 2/1998  | Al Ghatta et al. ....... 528/308.2 |
| 5,968,429 | A |  | 10/1999 | Treece et al. |
| 2002/0032300 | A1 |  | 3/2002 | Dowling et al. |
| 2002/0094402 | A1 |  | 7/2002 | Jen |
| 2002/0128427 | A1 |  | 9/2002 | Schaaf et al. |
| 2003/0139543 | A1 |  | 7/2003 | Wilhelm et al. |
| 2006/0189783 | A1 |  | 8/2006 | Deiss et al. |

FOREIGN PATENT DOCUMENTS

| DE | 4 131 362 |   | 3/1993 |
|---|---|---|---|
| DE | 10043277 |   | 3/2002 |
| EP | 0 222 714 |   | 5/1987 |
| EP | 0 712 703 | * | 5/1996 |
| EP | 0939095 |   | 9/1999 |
| EP | 1273610 |   | 1/2003 |
| JP | 06247899 |   | 6/1994 |
| JP | 9249744 |   | 9/1997 |
| WO | WO94/17122 |   | 8/1994 |
| WO | WO95/10557 |   | 4/1995 |
| WO | WO 03/033581 |   | 4/2003 |
| WO | WO 03/085026 |   | 10/2003 |
| WO | WO 2004/055093 |   | 7/2004 |
| WO | WO 2004/065909 |   | 8/2004 |
| WO | WO 2005/085318 |   | 9/2005 |

OTHER PUBLICATIONS

English Translation of International Preliminary Examination Report, issued by the European Patent Office on Mar. 10, 2004, 4 pages.
Chinese Office Action dated Jul. 1, 2005 for corresponding Chinese Application No. 200410002453.4, 2 pgs.
German Office Action dated Jun. 21, 2005 for corresponding German Application No. 10360752.8-44, 2 pgs.

* cited by examiner

*Primary Examiner*—Terressa Boykin
(74) *Attorney, Agent, or Firm*—Michael Best & Friedrich LLP

(57) ABSTRACT

The present invention relates to a method for producing solid-state polycondensed polyesters by using crystallization with or without subsequent solid-state polycondensation for producing bottles, sheets, films, and high-tenacity technical filaments.

19 Claims, 2 Drawing Sheets

METHOD AND APPARATUS FOR PRODUCING SOLID-STATE POLYCONDENSED POLYESTERS

Figure 1:
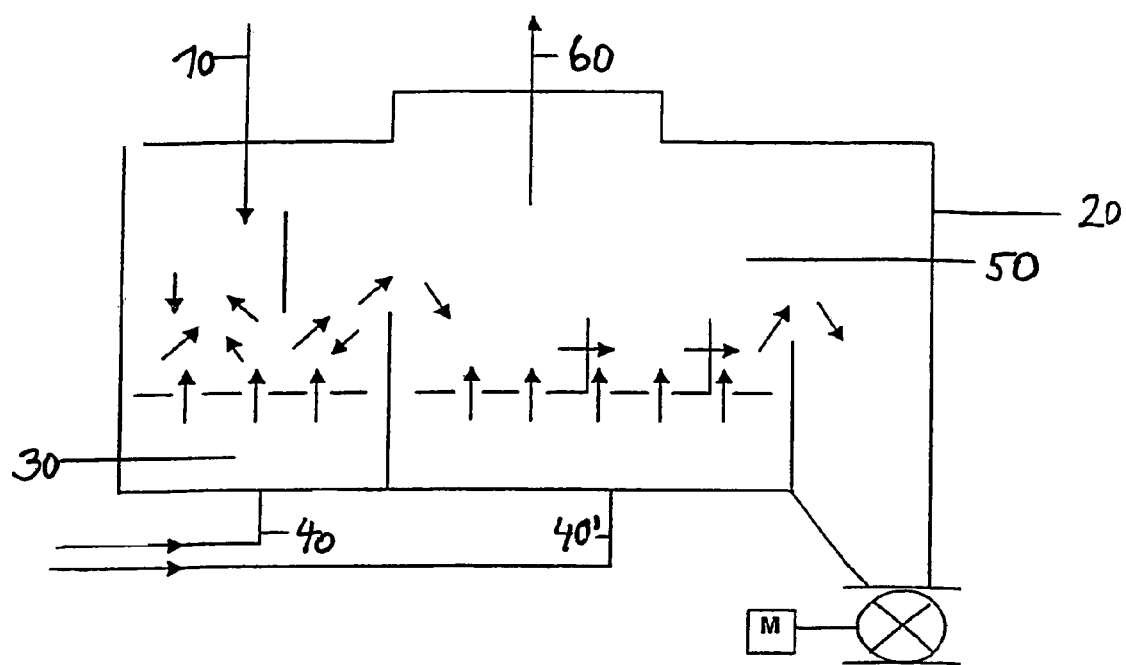

The present invention relates to an apparatus and a continuous or discontinuous method for producing solid-state polycondensed (highly condensed) polyesters by using crystallization with or without a subsequent solid-state polycondensation for producing bottles, sheets, films and high-tenacity technical filaments.

The known aromatic polyesters or copolyesters, in particular polyethyleneterephthalate and the copolymers thereof with small amounts of e.g. isophthalic acid or cyclohexanedimethanol, polybutyleneterephthalate, polytrimethyleneterephthalate, polyethylenenaphthalate and the copolyesters thereof, which serve as raw material for fibers, films and packaging, are prepared such that the polyester melt in the melt polycondensation stage is brought to a mean end viscosity. The mean degree of polycondensation, expressed in intrinsic viscosity (I.V.), ranges from 0.30 to 0.90 dl/g in polyethyleneterephthalate and its correspondingly low-modified copolyesters after melt polycondensation.

Since the production of granules with an I.V. above 0.65 dl/g is hardly possible, in particular in conventional autoclaves, and high viscosities >0.80 dl/g entail a considerable capacity reduction in melt polycondensation and since, moreover, the polyesters used for food packaging require a very low acetaldehyde value, the melt polycondensation in the prior art is followed by a solid-state polycondensation (SSP) which leads to an increase in I.V. in general by 0.05-0.4 dl/g and to a reduction of the acetaldehyde content of about 25-100 ppm to values <1 ppm in the PET.

In this solid-state polycondensation following the melt polycondensation stage, the mean viscosity is thus raised such that the strength required for the corresponding field of application is achieved, the acetaldehyde content in the case of food packaging is reduced in accordance with the requirements, and the exiting oligomer content is lowered to a minimum amount. It is here important that the acetaldehyde, which is bound as vinyl ester, also called depot acetaldehyde, is decomposed to such a degree that during processing of the polyester granules into packaging, in particular polyester bottles, according to the stretch blow and injection stretch blow method, only a minimum amount of acetaldehyde is re-developed (re-formed) in the polyester. Especially when mineral water is filled into polyester bottles, less than 2 ppm acetaldehyde should be contained in the bottle wall consisting of polyethyleneterephthalate.

Apart from SSP, methods are known for the dealdehydization of polyethyleneterephthalate by treatment with nitrogen or dry air, as described in U.S. Pat. No. 4,230,819. To obtain the required low acetaldehyde content in the material, temperatures of up to 230° C. are used. When air is used, a strong thermooxidative decomposition of the polyester must be expected at such elevated temperatures. When nitrogen is used, the costs for gas and complicated purification are increased.

U.S. Pat. No. 4,223,128 excludes temperatures of more than 220° C. when air is used as the carrier gas. Described is the desired increase in I.V. with the help of large amounts of dry air at a dew point of −40 to −80° C. At the treatment temperature of 200° C. as outlined in the examples of this patent, oxidative damage to individual grains of the granulate cannot be ruled out in continuous methods, which have a more or less wide range of residence times.

SSP achieves a chain extension of the polyesters in the solid state for keeping the side reactions, which occur to a stronger degree in a melt, as small as possible, as well as a removal of the harmful by-products. With this chain extension, which is expressed by an increase in I.V., it is possible to produce products, such as bottles or tire cord, which require an increased strength.

However, since polyesters are partly crystalline thermoplastic materials, they have a more or less large amorphous amount, depending on the type. When SSP is carried out, this fact poses problems because the amorphous amounts at the temperatures required for SSP lead to sticking, which may even lead to a standstill of the production plant.

Therefore, it is also known that as a precursor to SSP a crystallization of the partly crystalline chips from the melt polycondensation is carried out for preventing any tendency to sticking under nitrogen or air atmosphere, at temperatures between 160-210° C., as described in U.S. Pat. Nos. 4,064,112, 4,161,578, and 4,370,302.

WO 94/17122 discloses a 2-stage crystallization with preheating and intermediate cooling prior to SSP to prevent sticking. The described SSP temperature ranges from 205° C. to 230° C.

For improving the quality of the chips, it is possible to use, as described in JP 09249744 or U.S. Pat. No. 5,663,290, a moist inert gas before or during SSP, or—as disclosed in U.S. Pat. No. 5,573,820—the chips may previously be treated with hot water or directly with water vapor intensively at temperatures of up to 200° C. prior to crystallization. In this case, however, a strong undesired drop in I.V. by hydrolysis in the PET must already be:expected at the standard temperatures of >190° C.

A further method is the treatment of the chips to be crystallized with purified non-dried nitrogen from SSP in countercurrent flow in the second crystallization stage, as outlined in EP 222 714. The effect described therein for reducing the acetaldehyde content is rather evaluated as insignificant.

These crystallization steps aim at reducing the amorphous amount of the polyester to such an extent that SSP can be carried out without any sticking.

The basic differences between the performance of SSP and of crystallization are:
1. that the residence times in the case of crystallization are much shorter than in SSP, 3 h on the average compared to 5-40 h, and
2. in the case of crystallization physical processes prevail, as becomes e.g. apparent from the normally very slight rise in I.V. from 0.01 to 0.02 dl/g, while chemical reactions take place in the case of SSP, as can be seen from a rise in I.V. of normally 0.2 to 0.3 dl/g.

It is therefore the object of the present invention to provide a method for producing solid-state polyesters, which method can be carried out easily and simultaneously helps to maintain or improve the particularly high quality standards demanded from polyesters for packaging with respect to color, molar mass distribution, acetaldehyde content, acetaldehyde re-developing, oligomer amount and tendency to sticking, and to significantly reduce waste and dust formation.

According to the invention this object is achieved by a method for producing polyesters, comprising crystallization of a polyester material, characterized in that crystallization is carried out in two stages, wherein
in the first stage partly crystalline polyester material is provided, and in the second stage, the partly crystalline polyester material flows at temperatures suited for crystallization (i) under mechanical disturbance and gas in countercurrent flow, (ii) under mechanical disturbance and gas in concurrent flow, and (iii) without mechanical disturbance and gas in concurrent flow.

The present method is suited for making granules of partly crystalline aromatic polyesters or copolyesters, obtainable from one or more dicarboxylic acids or the methylesters thereof, such as terephthalic acid, isophthalic acid, naphthalinedicarboxylic acid and/or 4,4-bisphenyidicarboxylic acid, and one or more diols, such as ethyleneglycol, propyleneglycol, 1,4-butanediol, 1,4-cyclohexanedimethanol, neopentylglycol, and/or diethyleneglycol.

These starting compounds can be processed in a way known per se according to the continuous or discontinuous method of esterification or interesterification using known catalysts with a subsequent melt polycondensation under vacuum to obtain polyester material, preferably granules.

Preferably, polyethyleneterephthalate homopolymers and copolymers are used with a comonomer content of less than 10% by wt.

In the first stage of the method according to the invention, partly crystalline polyester material is provided. Preferably, the partly crystalline polyester material has a degree of crystallization of about 40-48%.

For providing the polyester material in the first stage of the method according to the invention, any suitable and partly crystalline polyester material may be used. The partly crystalline polyester material may be obtained by crystallization of a polyester material obtained from melt polycondensation. Preferably, to provide the polyester material in the first stage of the method according to the invention, amorphous polyester material obtainable after melt polycondensation, preferably granulate, is treated in the first stage for increasing the degree of crystallization to about 40 to about 48% under vortexing by way of a gas flow at suitable temperatures and residence times. Preferred temperatures range from about 170 to about 210° C., and preferred residence times amount up to about 30 min, preferably about 10 to about 30 min.

The gas used for vortexing is preferably air and/or nitrogen.

The partly crystalline polyester material is preferably produced by means of a fluidized bed reactor. In particular, the first stage of crystallization is carried out in-two zones, the crystallization in the first zone 1 being performed in a fluidized bed with mixing properties, and in the second zone 2 in a fluidized bed with controlled granulate flow.

FIG. 1 shows a preferred embodiment of a fluidized bed reactor 20 with which the crystallinity of a polyester granulate is raised to the desired degree, in particular to 40-48%. The granulate is here conveyed by a conveying device 10 into a fluidized bed crystallizer 20 equipped with rectangular fluidization surfaces and with two zones 30, 50, in which the granulate is crystallized at rising temperatures of 170-210° C. and, optionally, under dry gas at a dew point of 20 to −50° C.

The gas/chip ratio-may be 3-4 in the first zone and 2-3 in the second zone, at a residence time of 10-30 min.

As shown in FIG. 1, the gas can be-guided such that the gas by being distributed over a perforated sheet passes into the first zone 30 via a gas inlet opening 40 at a gas rate of 3.2-4 m/sec and into the second zone 50 via a gas inlet opening 40' at a gas rate of 2.1-2.7 m/sec (velocity in empty space) and leaves the crystallizer again via a joint gas outlet 60 in the upper region. This way of guiding the gas effects a fluidized bed with mixing properties in the first zone 30 and to a vortexing with controlled granulate flow in the second zone 50. The dust amount at the outlet of the crystallizer is <10 ppm.

The granulate obtained after the first stage of crystallization has preferably a degree of crystallization in the chip of about 40-48%.

The partly crystalline polyester material which can be used according to the invention, preferably granulate, flows in a second stage at temperatures suited for crystallization (i) under mechanical disturbance and gas in countercurrent flow, (ii) under mechanical disturbance and gas in concurrent flow, and (iii) without mechanical disturbance and gas in concurrent flow.

"Flowing" of the polyester material in the sense of the present invention means a movement of the polyester material in one direction, the movement being e.g. effected by gravitation and/or mechanical transportation.

Steps (i) to (iii) of the second stage of the method according to the invention are carried out particularly preferably in a continuous way, i.e., the polyester material passes through steps (i) to (iii) in a continuous flow. The polyester material, however, may also be treated in batches in steps (i) to (iii). Preferably, steps (i) to (iii) are carried out in the indicated sequence. However, it is also possible to carry out steps (i) to (iii) in any other sequence.

The gas used in the second stage (i) to (iii) is preferably air or nitrogen, in particular nitrogen.

The temperature suited for crystallization in the second stage (i) to (iii) is preferably about 190 to about 220° C., more preferably 190 to 215° C., and particularly preferably 200 to 210° C.

The residence time of the polyester material in the second stage (i) is preferably about 30 to about 60 min, in the second stage (ii) about 30 to about 60 min, and in the second stage (iii) about 60 to about 180 min.

The second stage of crystallization is particularly preferably carried out in three zones of a shaft type crystallizer, namely zones 3, 4 and 5, in which steps (i) to (iii) of the second stage are carried out. In zone 3, the granules are subjected under periodically arising mechanical disturbance with gas in countercurrent flow, in zone 4 under periodically arising mechanical disturbance with gas in concurrent flow, and in zone 5 under no mechanical disturbance and gas in concurrent flow.

The second stage of crystallization is preferably carried out in an apparatus according to the invention for producing polyesters. The apparatus (70) according to the invention for crystallizing polyester material in granular form, e.g. a shaft type crystallizer, comprises three successive sections (80, 90, 100), at least one inlet opening (110) provided in the first section (80), at least one outlet opening (12) provided in the third section (100), a means for effecting mechanical disturbance of the polyester material (130), which is provided in the first and second sections (80, 90), at least one gas inlet opening (140) arranged in the transitional area from the first to the second section, and at least one gas outlet opening (150, 160) which is provided both in the first and third section.

In a preferred embodiment, the apparatus according to the invention comprises a means for generating a periodic mechanical disturbance (130) with a shaft (170) that has provided thereon-at least one, preferably six or more, arms (180, 180'), which effect a periodic mechanical disturbance of the flowing polyester material by rotation of shaft (170). The means may also comprise a first shaft and a second shaft, at least one arm being provided on each shaft.

Figure 2:
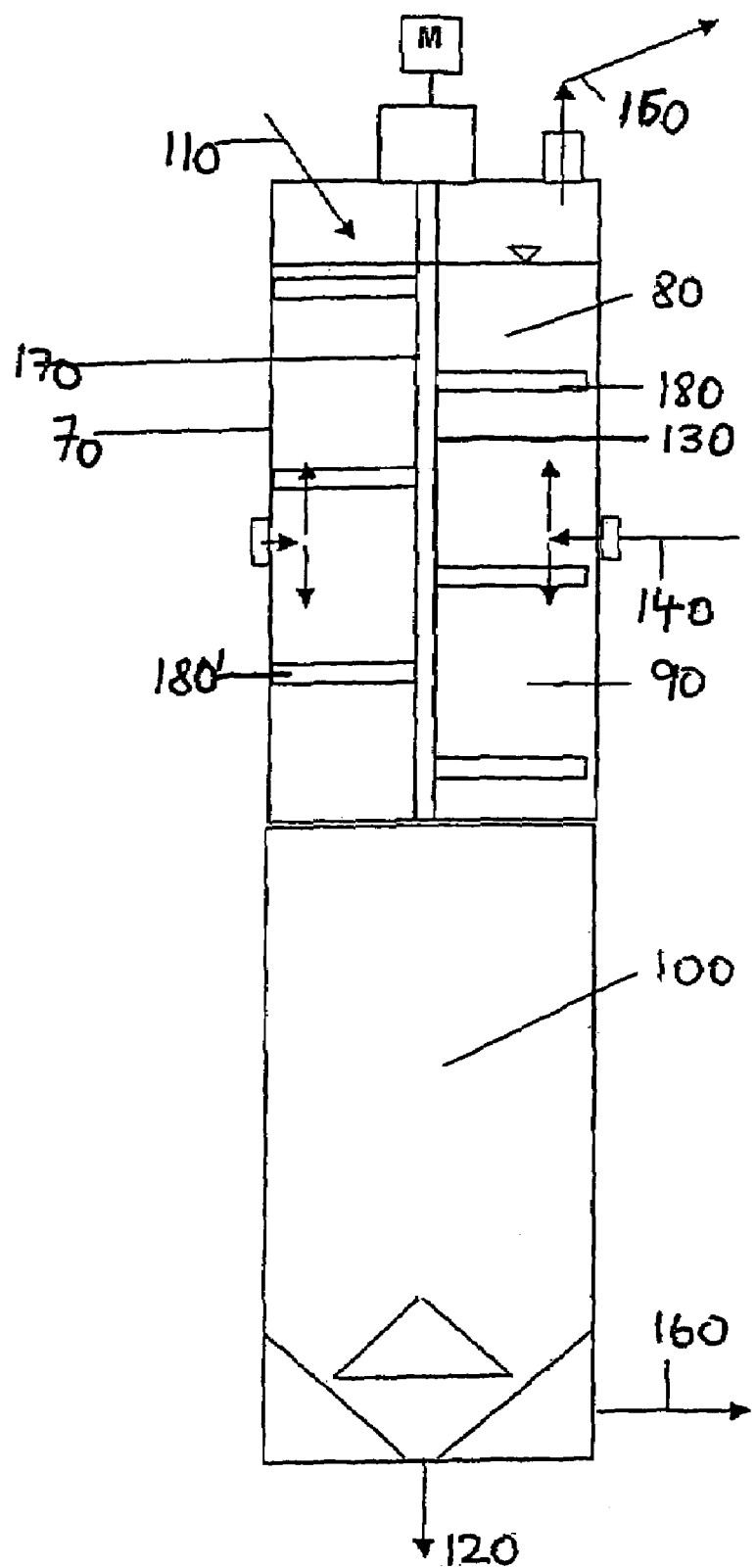

FIG. 2 shows a preferred embodiment for an apparatus according to the invention, namely a shaft type crystallizer 70, in which the second stage of the method according to the invention can be carried out. The granulate is introduced in the second stage, as shown in FIG. 2, into a continuously operating, vertically standing three-part shaft crystallizer 70 having a centered rotatable shaft 170 installed in the longitudinal axis. In the first and second section 80, 90 of the shaft crystallizer, zones 3 and 4, arms 180, 180' are mounted on the shaft at specific intervals and with a small flow resistance, the shaft effecting a periodic mechanical disturbance of the bulk material. Due to the movement of the granules, the formation of agglomerates (sticking) of the material is prevented. In the third section 100 of the shaft type crystallizer, the granules are treated in zone 5 without any disturbance.

In the third and fourth zone, the granules are disturbed mechanically and periodically, while in the fifth undisturbed zone the residence time is made uniform at a beginning postpolycondensation.

The gas is guided such that it is supplied between the third and fourth zone (first and second section of the shaft crystallizer) via a gas inlet opening 140 and leaves the crystallizer again in the upper or first section 80 via a gas outlet opening 150 and in a proportionate amount also in the lower or third section 100 via a gas outlet opening 160. The gas is here guided in the third zone (first section of the shaft crystallizer) in countercurrent flow with respect to the granules and in the fourth and fifth zone in concurrent flow (second and third section of the shaft crystallizer).

The gas outlet openings (150, 160) are here preferably arranged such that the gas introduced via the gas inlet opening (140) is guided with the granules in countercurrent or concurrent flow as long as possible, i.e. at the beginning of the first section (80) and at the end of the third section (100) of the shaft crystallizer (70).

In the third zone (first section 80 of the shaft crystallizer 70), the PET granules are heated under periodically acting mechanical disturbance preferably with hot gas, in particular nitrogen, in countercurrent flow with respect to the granules at a gas-chip ratio of 1-3 and at a residence time of 30-60 min to 190-220° C.

In the fourth zone (second section 90 of the shaft crystallizer 70), the PET is further crystallized and made uniform under periodically acting mechanical disturbance preferably at 190-220° C. with the gas, in particular nitrogen, in concurrent flow at a gas-chip ratio of 0.5-1. The residence time is 30-60 min.

The PET granules treated in this way in the third and fourth zone are preferably treated in the undisturbed fifth zone (section 100 of the shaft type crystallizer 70) at a temperature of 190-215° C. in concurrent fashion at a gas/chip ratio of 0.1-1 in such a way that at a mean residence time of 60-180 min, a slight postpolycondensation already takes place in said zone, apart from aldehyde reduction and crystallization. According to the method of the invention, the tendency to sticking of the granules is thereby reduced considerably.

The total residence time of the polyester material in the first and second stage of crystallization, provided that it includes the above-described zones 1 to 5, is preferably between 100-350 min, particularly 130-330 min, the residence time ratio in the first stage in comparison with the residence time in the second stage being 1:4 to 1:32. Particularly preferably, the residence time ratio in the first and second stages of crystallization, on condition said stages comprise zones 1 to 5, has a residence time in zones 3 and 4 that is 4 to 6 times longer than in zones 1 and 2, and a residence time in zone 5 that is 2 to 3 times longer than in zones 3 and 4.

The polyester material used in the method of the invention has preferably an I.V. of at least about 0.3 dl/g, more preferably about 0.3 dl/g to about 0.9 dl/g, even more preferably about 0.3 dl/g to 0.8 dl/g, particularly preferably about 0.66 dl/g to 0.9 dl/g, particularly about 0.72 to 0.8 dl/g. Particularly preferably, a polyester material is used that has an I.V. of at least about 0.66 dl/g, more preferably about 0.66 to 0.8 dl/g, and particularly about 0.72 to 0.8 dl/g, because the material obtained thereby has a desired low content of acetaldehyde, namely <10 ppm, particularly <1 ppm, and is therefore suited for further processing without subsequent SSP into polyester molded articles in which a low acetaldehyde content is required, e.g. bottles. Surprisingly enough, it has now been found that polyester material, such as granulate, can be used with a high I.V. when the method according to the invention is carried out.

When polyester material with an I.V. of at least about 0.3 dl/g to about 0.72 dl/g is used, SSP is preferably carried out thereafter.

Since partly crystalline-polyester during crystallization in the crystallizer and in the subsequent solid-state polycondensation reactor may tend to form agglomerates to an increased degree due to a high exothermal heat development, and since such sticking may be so strong that they no longer separate from one another when standard crystallization and solid-state polycondensation methods are employed, the use of spherical polyester material is preferred in the method according to the invention. However, it is also possible to use other granular shapes, such as cylindrical or scale-like granules.

Cylindrical granules, however, are not preferred because they easily stick together because of the surfaces and edges, and wear is increased. Due to the asymmetry of the cylindrical chips, a uniform crystallization from the exterior to the core of the chip is difficult. In comparison with the balanced cylindrical chip, the use of approximately spherical chips offers the advantage of a more uniform crystallization, an improved molar mass distribution in the chip, and a bulk weight that is higher by 5 to 10%. The dust amount which is lower when spherical chips are used must be regarded as a further essential advantage.

Particularly preferably, the granules used have a surface of 1.45-2.0 m²/kg, preferably 1.50 to 1.85 m²/kg.

The granules obtained with the method according to the invention have preferably a uniform degree of crystallization of about 49 to about 53%, in particular about 52%, and are pretreated in this crystallization technique such that a sticking of the PET granules due to exothermal reactions in a possibly subsequent solid-state postcondensation is avoided.

The granules obtained according to the invention have an acetaldehyde content of <10 ppm, particularly preferably 0.5-5 ppm, and particularly <1 ppm.

The dust amount of the granules is preferably <10 ppm after crystallization according to the invention.

Surprisingly enough, it has been found that upon application of the method according to the invention with the 2-stage crystallization, in particular by using a fluidized bed and shaft type crystallization, a polyester granulate can be produced with a low acetaldehyde value, a small acetaldehyde reformation, excellent color brilliance, very low dust values, without sticking and upon use of chips with a high I.V. between 0.66-0.90 dl/g from melt polycondensation, a subsequent solid-state polycondensation can be omitted.

The granules obtained according to the invention have preferably an I.V. variation of less than 1.5%.

Moreover, the present invention relates to a method for producing polyester molded articles, polyester material, in particular granules, being obtainable according to the method of the invention without any solid-state polycondensation.

In particular, polyester material, especially in the form of granules or chips, which was produced with the method according to the invention and with an I.V. from melt polycondensation of >0.66 dl/g, can directly be supplied without any further condensation in a solid-state polycondensation reactor to processing in the stretch blow or injection stretch blow method for producing polyester molded articles. On the other hand, the polyester material of a lower I.V. can be subjected after melt polycondensation and the crystallization method according to the invention in a subsequent step to a standard solid-state polycondensation which operates continuously or discontinuously, and can then be used for producing polyester molded articles.

The polyester molded articles are preferably selected from the group consisting of bottles, sheets, films and high-tenacity technical filaments.

The invention shall now be described in more detail with reference to a few embodiments that are not limiting in any way. The characteristic values as indicated were here determined as follows:

The intrinsic viscosity (I.V.) was measured at 25° C. in a solution of 500 mg polyester in 100 ml of a mixture consisting of phenol and 1,2-dichloirobenzol (3:2 weight parts).

The COOH terminal group concentration was determined by means of photometric titration with 0.05 ethanolic potash lye versus bromothymol blue of a solution of a polyester in a mixture of o-cresol and chloroform (70:30 parts by weight).

Diethylenegylcol (DEG), isophthalic acid (IPA), and 1,4-cyclohexanedimethanol (CHDM) are determined in the polyester by means of gas chromatography after a preceding methanolysis of 1 g polyester in 30 ml methanol with addition of 50 mg/l zinc acetate in a sealed tube at 200° C.

The measurement of the turbidity value in "nephelometric turbidity units" (NTU) was carried out in a 10% by wt. solution of polyester in phenol/dichlorobenzol (3:2 parts by wt.) with a nephelometer of the company Hach (type XR, according to U.S. Pat. No. 4,198,161) in a cuvet having a diameter of 22.2 mm, by analogy with the DIN standard 38404, part 2, which is usual for water. The intensity of the stray light is measured in comparison with a formazin standard solution less the value of the solvent (about 0.3 NTU).

The color values L and b were measured according to HUNTER. The polyester chips were first crystallized in the drying oven at 135±5° C. for one hour. The color values were then determined by measuring the hue of the polyester sample in a three-range color meter with three photocells, having each arranged upstream thereof red, green and blue filters (X-, Y- and Z-values). Evaluation was carried out according to HUNTER's formula, where $$L = 10\sqrt{Y} \text{ and}$$

$$b = \frac{7,0}{\sqrt{Y}}(Y - 0,8467 Z)$$

The acetaldehyde was expelled by heating in a closed vessel from polyester and the acetaldehyde was determined in the gas chamber of the vessel by gas chromatography with the headspace injection system H540, Perkin Elmer; carrier gas: nitrogen; column: 1.5 m special steel; filling Poropack Q, 80-100 mesh; sample amount: 2 g; heating temperature: 150° C., heating duration: 90 min.

For the determination of the acetaldehyde re-developing rate, PET chips were ground and the ground material was molten in a thermodesorber under defined conditions (300° C. and three residence times: 12-25 min). The content of the resulting acetaldehyde adsorbed on Tenax was then determined by gas chromatography.

The dust analysis is carried out by gravimetry. To this end 1 kg of the chips is washed with methanol, the washing agent is filtered off via a filter and the residue is dried and weighed.

EXAMPLE 1

Comparison

In Example 1, approximately amorphous cylindrical chips with a weight of 15.5 mg/chip and a surface of 1.85 m²/kg, a bulk weight of 790 kg/m³ and an I.V. of 0.612 dl/g, were crystallized from the melt polycondensation method for producing slightly modified PET for bottles to be filled with carbonated soft drinks (CSD), water or other filling media and subjected to solid-state polycondensation.

EXAMPLE 2

In Example 2, approximately round chips with a weight of 15.5 mg, a surface of 1.55 m²/kg and a bulk weight of 840 kg/m³ were used and crystallized and then subjected to solid-state polycondensation according to standard methods, in accordance with the method according to the invention.

Material used in Examples 1 and 2:

Catalyzer content Sb: 200 ppm, phosphor content 17 ppm, cobalt: 15 ppm, blue dye: 0.5 ppm, IPA: 2% by wt., DEG: 1.3% by wt.

The results of Example 1 are shown in Table 1.1 and the results of Example 2 in Table 1.2.

TABLE 1.1

Example 1 (standard crystallization with subsequent SSP)

| Analyses | Material used: cylindrical chip shape | 1. Crystallizer fluidized bed crystallizer VWZ: 60 min. T: 200° C. | 2. Crystallizer blade type crystallizer VWZ: 75 min T: 219° C. | SSP VWZ: 12 h T: 208.5° C. delta I.V. = 0.200 [dl/g] |
|---|---|---|---|---|
| I.V. [dl/g] | 0.612 | 0.617 | 0.621 | 0.812 |
| COOH [mmol/kg] | 27 | 28 | 26 | 28 |
| DSC: Tm/Tk/Tg [° C.] | 250/143/78 | | | 250.5/145/79.7 |
| Color L | 82.7 | 84.9 | 87.7 | 89 |
| Color a | −1.6 | −1.4 | −1.4 | −1.4 |
| Color b | −3.6 | −0.8 | −0.7 | −0.5 |
| AA [ppm] | 45 | 9.1 | 3.5 | 0.5 |
| KTG [° C.] | — | 48.5 | 51 | 55.6 |
| AA-reformation [ppm] | — | | | 9.7 |
| Dust | — | <10 | >500 | >500 |

TABLE 1.1-continued

Example 1 (standard crystallization with subsequent SSP)

| Analyses | Material used: cylindrical chip shape | 1. Crystallizer fluidized bed crystallizer VWZ: 60 min. T: 200° C. | 2. Crystallizer blade type crystallizer VWZ: 75 min T: 219° C. | SSP VWZ: 12 h T: 208.5° C. delta I.V. = 0.200 [dl/g] |
|---|---|---|---|---|
| [ppm] | | | | |

VWZ = residence time,
T = temperature

TABLE 1.2

Example 2

| Analyses | Material used: spherical chip shape | 1. Crystallization (zone 1 und 2) fluidized bed crystallizer VWZ: 60 min T: 200° C. | 2. Crystallization shaft type crystallizer (zones 3 to 5) VWZ: 180 min T: 215° C. | SSP VWZ: 12 h T: 207.5° C. delta I.V. = 0.240 [dl/g] |
|---|---|---|---|---|
| I.V. [dl/g] | 0.602 | 0.616 | 0.636 | 0.842 |
| COOH [mmol/kg] | 30 | 27 | 26 | 26 |
| DSC Tm/Tk/Tg [° C.] | 250/143/78.4 | — | — | 251/145/80.1 |
| Color L | 83 | 85.1 | 88.1 | 89.4 |
| Color a | -1.7 | -1.4 | -1.3 | -1.3 |
| Color b | -3.3 | -1.0 | -0.6 | -0.6 |
| AA [ppm] | 55 | 8.8 | 1 | 0.2 |
| KTG [° C.] | — | 46.1 | 53.1 | 55.2 |
| AA-reformation] | — | | | 9.3 |
| Dust [ppm] | <10 | <10 | <10 | <10 |

EXAMPLES 3 AND 4

In a further test, approximately round chips with a weight of 15.5 mg and a surface of 1.55 m²/kg, a bulk weight of 840 kg/m³ and a high I.V. of 0.79-0.80 dl/g, produced according to the melt polycondensation method, were processed with two different catalyzer systems according to the crystallization method of the invention to obtain finished granules for bottles, so that a further processing of the slightly modified PET chips into bottles to be filled with soft drinks, water or other filling materials was easily possible. The results are shown in Tables 2.1 and 2.2.

Material used in Example 3, Table 2.1
Catalyzer content antimony (Sb): 250 ppm, phosphor content: 50 ppm, cobalt: 25 ppm, blue dye: 1.0 ppm, IPA: 2.0% by wt. DEG: 13.% by wt.

TABLE 2.1

Example 3

| Analyses | Material used: spherical chip shape catalyzer: 250 ppm Sb | 1. Crystallization (zones 1 und 2) fluidized bed crystallizer VWZ: 60 min. T: 200° C. | 2. Crystallization (zones 3 to 5) blade type crystallizer VWZ: 180 min T: 215° C. Delta I.V. = 0.017 [dl/g] |
|---|---|---|---|
| I.V. [dl/g] | 0.804 | 0.799 | 0.812 |
| COOH [mmol/kg] | 22 | 20 | 18 |
| DSC Tm/Tk/Tg [° C.] | 248/152/79 | | |
| Color | 76 | 85 | 86.5 |
| Color a | -2 | -1.7 | -1.5 |
| Color b | -5.5 | -3.3 | -2 |
| AA [ppm] | 80 | 15 | 3.2 |
| KTG [° C.] | — | 47.1 | 52.6 |
| AA-reformation [ppm] | | | 9.5 |
| Dust [ppm] | <10 | <10 | <10 |

Material used in Example 4, Table 2.2
Catalyst content ECOCAT B®: metal 5 ppm, phosphor content: 10 ppm, blue/red dye: 1.5/1.25 ppm, IPA: 2.0% by wt., DEG: 1.3% by wt.

TABLE 2.2

Example 4

| Analyses | Material used spherical chip form catalyzer: ECOCAT B ® 5 ppm metal | 1. Crystallization (zones 1 and 2) fluidized bed crystallizer VWZ: 60 min./T: 200° C. | 2. Crystallization (zones 3 to 5) shaft type crystallizer VWZ: 180 min/ T: 215° C. delta I.V. = 0.032 [dl/g] |
|---|---|---|---|
| I.V. [dl/g] | 0.795 | 0.797 | 0.827 |
| COOH [mmol/kg] | 15 | 14 | 13 |
| DSC Tm/Tk/Tg [° C.] | 248/152/79.5 | | |
| Color L | 72 | 81 | 84 |
| Color a | -3.5 | -2.2 | -2 |
| Color b | 1.4 | 1.7 | 1.9 |
| AA [ppm] | 40 | 7.9 | 0.8 |
| KTG [° C.] | — | 47.8 | 52.7 |
| AA-reformation [ppm] | | | 8.9 |
| Dust [ppm] | <10 | <10 | <10 |

Prior to pressing into preforms and bottles on a single-stage machine of ASB (injection stretch blow molding machine) of type 250 EX HAT, 6 cavity tool, with an output of 800-1000 bottles/hour, said material was dried in a Challenger dryer at 170° C. for 4 hours.

The preforms and bottles were produced without any problems. The transparency of the bottles was good and color neutral. The acetaldehyde content according to the standard headspace method was between 1.6-1.9 µg/l in the bottles according to the method of the invention, as compared to bottles according to the conventional solid-state polycondensation with cylindrical chips at 2.2-2.6 µg/l. The mechanical properties of the bottles did not differ.

The invention claimed is:
1. A method for producing a polyester by crystallization of a polyester material comprising:

(a) in a first stage producing a partly crystalline polyester material from the polyester material at rising temperatures from about 170 to about 210° C.; and (b) in a second stage permitting the partly crystalline polyester material of (a) to flow at one or more temperatures suited for crystallization under a series of conditions, the series comprising (i) mechanical disturbance and gas in countercurrent flow, (ii) mechanical disturbance and gas in concurrent flow, and (iii) without mechanical disturbance and gas in concurrent flow, thereby producing the polyester.

2. The method according to claim 1, wherein the partly crystalline polyester material produced in (a) has a degree of crystallization of about 40 to 48%.

3. The method according to claim 1, wherein the partly crystalline polyester material is produced in (a) by treating the polyester material by vortexing in a gas flow at a residence time of up to about 30 min.

4. The method according to claim 3, wherein the vortexing of the polyester material is carried out in a fluidized bed crystallizer.

5. The method according to claim 4, wherein in the first stage vortexing is carried out in a first zone in a fluidized bed with mixing properties and in a second zone in a fluidized bed with controlled granulate flow.

6. The method according to claim 5, wherein vortexing with gas is carried out at a gas rate of about 3.2 to 4 m/s in the first zone and at a gas rate of about 2.1 to 2.7 m/s in the second zone.

7. The method according to claim 1, wherein the one or more temperatures used in the second stage are about 190 to about 220° C.

8. The method according to claim 1, wherein the residence time in (b) (i) is about 30 to about 60 min, in (b) (ii) about 30 to about 60 min, and in (b) (iii) about 60 to about 180 min.

9. The method according to claim 1, wherein the second stage is carried out in a shaft type crystallizer.

10. The method according to claim 1, wherein the polyester material used is granulate.

11. The method according to claim 2, wherein the total residence time of the polyester material in the first and second stage is about 100 to 350 min.

12. The method according to claim 2, wherein the residence time ratio of the polyester material in the first stage to the second stage is about 1:4 to 1:32.

13. The method according to claim 1, wherein the polyester material of step (a) has an I.V. of at least 0.3 dl/g.

14. The method according to claim 10, wherein the polyester material is spherical granulate.

15. The method in accordance with claim 1, further comprising (c) molding the polyester to form molded articles without a solid state polycondensation.

16. The method according to claim 15, wherein the polyester molded articles are selected from the group consisting of bottles, sheets, films and high-tenacity technical filaments.

17. A method for producing a polyester by crystallization of a polyester material comprising:

(a) producing a partly crystalline polyester material from the polyester; and (b) permitting the partly crystalline polyester material of (a) to flow at one or more temperatures from about 190 to about 220° C. under a series of conditions, the series comprising (i) mechanical disturbance and gas in countercurrent flow, (ii) mechanical disturbance and gas in concurrent flow, and (iii) without mechanical disturbance and gas in concurrent flow, thereby producing the polyester.

18. The method of claim 17, wherein step (a) further comprises passing a gas at a rate of 3.2 to 4 meters per second over the polyester material or partly crystalline polyester material.

19. A method for producing a polyester comprising:

(a) providing a partly crystalline polyester material having a degree of crystallization of about 40 to 48%; and (b) permitting the partly crystalline polyester material of (a) to flow at temperatures from about 190 to about 220° C. under a series of conditions, the series comprising (i) mechanical disturbance and gas in countercurrent flow, (ii) mechanical disturbance and gas in concurrent flow, and (iii) without mechanical disturbance and gas in concurrent flow, thereby producing the polyester.

* * * * *